UNITED STATES PATENT OFFICE.

ERNST JOHN LJUNGGREN, OF CHICAGO, ILLINOIS.

REMEDY FOR TOOTHACHE.

SPECIFICATION forming part of Letters Patent No. 424,009, dated March 25, 1890.

Application filed August 19, 1889. Serial No. 321,301. (No specimens.) Patented in Sweden September 3, 1887, No. 1,325.

*To all whom it may concern:*

Be it known that I, ERNST JOHN LJUNGGREN, a subject of the King of Sweden, residing at Chicago, in the county of Cook and State of Illinois, have invented a new and useful Composition of Matter to be Used as a Remedy for the Toothache, (for which I have obtained a patent in Sweden, one of the United Kingdoms of Norway and Sweden, No. 1,325, dated September 3, 1887,) of which the following is a specification.

The principle ingredient in said remedy consists of an extract from the leaves of the blue-gum tree, (*Eucalyptus globulus*,) which is made in the following manner: The leaves are gathered in fresh condition, freed from dirt, cut in pieces, and placed in suitable vessels. Next pour over them a mixture of alcohol and brandy, made of seventy per cent. of pure alcohol and thirty per cent. of brandy, (Cognac,) in such proportions that to two hundred grams of leaves is used one liter of said solution. After the vessels have been hermetically sealed or closed they are allowed to stand in a room of medium temperature for the period of one month. After that time has passed the solution is drawn off through a sieve, the leaves are subjected to pressure, and the juice so obtained is thoroughly mixed with that previously drawn off. Now the whole extract is put in bottles, which must be instantaneously well corked. To each centiliter of extract is added three or four drops of oil of cloves (to give it a more pleasant odor) and six to eight drops of balsam vitæ, after which the extract is ready for use.

The manner in which it is applied is as follows: A piece of cotton is thoroughly saturated with the extract and applied at the root of the aching tooth; also, into the cavity, if such cavity exists. It may be repeated as often as three or four times an hour if it is found necessary. The gums, epiglottis, and other sensitive organs are not injured by contact with this extract.

Now what I claim, and wish to secure by Letters Patent of the United States, is—

The herein-described composition of matter to be used as a remedy for toothache, consisting of the extract of *Eucalyptus globulus* in alcohol and brandy, (Cognac,) with oil of cloves and balsam vitæ, combined in the proportions specified, as set forth in the above specification.

ERNST JOHN LJUNGGREN.

Witnesses:
W. CARLON,
J. W. OHLSSON.